United States Patent
Boyd

(10) Patent No.: US 7,107,346 B2
(45) Date of Patent: Sep. 12, 2006

(54) SYSTEMS AND METHODS FOR DISPLAYING IMAGES

(75) Inventor: David W. Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 669 days.

(21) Appl. No.: 09/997,520

(22) Filed: Nov. 28, 2001

(65) Prior Publication Data

US 2003/0206194 A1 Nov. 6, 2003

(51) Int. Cl.
G06F 15/16 (2006.01)
(52) U.S. Cl. .......................... 709/227; 709/203; 705/14
(58) Field of Classification Search ................ 709/227, 709/203; 705/14
See application file for complete search history.

(56) References Cited

U.S. PATENT DOCUMENTS

| | | | |
|---|---|---|---|
| 5,612,741 A * | 3/1997 | Loban et al. ................ 348/383 |
| 6,237,022 B1 | 5/2001 | Bruck et al. | |
| 6,250,428 B1 | 6/2001 | Amo et al. | |
| 6,275,201 B1 | 8/2001 | Kratzenberg et al. | |
| 6,278,499 B1 | 8/2001 | Darbee et al. | |
| 6,408,278 B1 * | 6/2002 | Carney et al. ................ 705/14 |
| 6,430,603 B1 * | 8/2002 | Hunter ....................... 709/207 |
| 6,873,710 B1 * | 3/2005 | Cohen-Solal et al. ....... 382/100 |
| 2003/0004805 A1 * | 1/2003 | Vaitekunas et al. .......... 705/14 |

OTHER PUBLICATIONS

Web page by The Ceiva Network, "Introducing Ceiva. The World's First Internet-Connected Picture Frame", pp. 1-2; http://www.ceiva.com/, dated Aug. 17, 2001.

Web page by The Ceiva Network, "Ceiva News". pp. 1-2; http://www.ceiva.com/public/news_main_page.jsp, dated Aug. 17, 2001.

Web page by The Ceiva Network, "Ceiva Logic, Inc. Unveils Next Generation Ceiva II Picture Frame Designed by IDEO", pp. 1-2, http://www.ceiva.com/public/news_pressreleases_ceiva11.jsp, dated Aug. 17, 2001.

Web page by The Ceiva Network, "Ceiva Logic, Inc. Announces Partnership with Getty Images to Showcase Find Art in Homes Across America", pp. 1-3; http://www.ceiva.com/public/news_pressreleases_getty.jsp, dated Aug. 17, 2001.

Web page by The Ceiva Network, (BW) (CA-CIRRUS-LOGIC) (CRUS) Cirrus Logic's Maverick Chip Speeds Concept to Production for Industry's First 'Internet-Enabled Picture Frame', pp. 1-3, http://www.ceiva.com/public/news_pressreleases_maerick.jsp, dated Aug. 17, 2001.

Web page by The Ceiva Network, "Doctor Design", pp. 1-2, dated Aug. 17, 2001, http://www.ceiva.com/public/news_pressreleases_drdesign.jsp.

Web page by The Ceiva Network, "The Idea Grove", pp. 1-3; http://www.ceiva.com/public/news_pressreleases_theideagrove.jsp, dated Aug. 17, 2001.

* cited by examiner

Primary Examiner—Bunjob Jaroenchonwanit
Assistant Examiner—Duyen Doan

(57) ABSTRACT

A system and method are disclosed for distributing and presenting preferred data from a host server to a display device located at a predetermined remote premise through a communications network. The method involves identifying a user preference, providing at least one data feed containing information related to the user preference, selecting preferred data from the data feed corresponding to the user preference, pre-loading information that matches the preferred data from the host server to the display device, and presenting the preferred data through the display device.

19 Claims, 7 Drawing Sheets

SYSTEMS AND METHODS FOR DISPLAYING IMAGES

TECHNICAL FIELD

The present disclosure relates to digital image distribution and display. More particularly, the disclosure relates to systems and methods for leasing digital images via a communications network.

BACKGROUND OF THE INVENTION

In most urban centers, exposure to information such as advertising information and current news information has become an accepted part of everyday life. Apart from newspapers, magazines, and television, mass advertising information is visually presented by way of billboards, posters, and other various signs, which are capable of displaying relatively fixed images. Countless products and services are presented to the public via fixed images with limited text. In an effort to capture and hold public attention, some mass advertising has been presented via pixelboards containing an array of light emitting diodes and/or lamps that can be controlled over time to present simple animation, pictures, and updateable textual information. Recently, billboards capable of presenting a series of different fixed images have been used to advertise more than one product or service. Despite these advances, manufacturers, distributors, and advertisers are continuously seeking further advances in public image displays. In addition to efforts targeted to attract consumers, distributors seek further advances for maintaining and updating advertisements and other public displays.

For example, operators of billboards maintain not only the support structure, but must identify a new client and create the appropriate sized image when a present client no longer wishes to display their particular advertisement on the board. After the image has been generated, technicians must visit the site to apply the new image. Similarly, each new graphic image, text message, or animation for a new client or message designated for a pixel board is programmed and the program delivered to the site of the pixelboard. By way of further example, in order to update and/or replace publicly displayed posters and placards, the replacements must be printed, distributed, and the various display sites visited in order to remove and replace the various advertisements.

Recent advances in data storage capacity and data compression techniques, coupled with advances in the art of image display technology, have resulted in the proliferation of high-resolution television quality display devices. Nearly every major sporting and convention venue has one or more display devices suited for providing advertising, information updates, close-ups of the action or performance, replays, and/or other images. The viewing public has come to expect such high-resolution color displays. However, many of these public venue displays are quite complex and require a significant support operation requiring real-time human interaction and a significant amount of computing power to supply the updated information to the viewers.

Other public display devices consist of television type display monitors associated with closed-circuit input feeds from within the public facility. These systems are well known and are relatively easy to operate. However, closed-circuit display systems still require a significant level of human interaction at the point of distribution.

A number of much simpler public display devices have been attempted with various degrees of success. For example, in order to reach a captive audience several public display systems have been developed for use in public elevators. Display systems for these environments often attempt to provide real-time information pertinent to their captive audiences.

To date, information display systems for elevators are capable of presenting at most the floor number, a floor directory of tenants and in some cases simple text based news information. For example, U.S. Pat. No. 4,995,479 to Fujiwara, appears to describe a display apparatus for an elevator in which information regarding the operating conditions of the elevator is displayed along with "general" information, such as news and weather. A display unit is provided within the elevator cab and includes a display area for displaying text along side a picture display area for displaying predetermined graphic images. Predetermined pieces of information are assembled and assigned a number indicative of a priority for that piece of information. The information is selected for display in accordance with the priority value associated with the information. The system described in the '479 patent is not well suited for the presentation and leasing of advertisements as the messages are not easily updateable and information is restricted to basic text and primitive graphic data.

U.S. Pat. No. 5,056,629 to Tsuji, et al., appears to describe another display apparatus capable of presenting news, weather, etc., to those in an elevator cab. The information is selected to be displayed at predetermined times. The device described in this patent allows for the information displayed to be corrected (i.e., new or replacement information displayed) through inputs made remotely from the elevator cab or from a caretaker's room via a portable computer. As with the '479 patent, the '629 patent discloses a simple scrolling message display system updateable via a remote computer. The device disclosed in the '629 also requires extensive on-site user intervention to update the displayed messages.

In U.S. Pat. No. 5,485,897 to Matsumoto, et al., an elevator display system is disclosed in which operational information concerning the elevator, in particular a floor indicator, is superimposed on a background image on a display screen. The background image is described as being a plurality of still pictures assigned to the different floors at which the elevator stops or different kinds of animations assigned to the different floors. As with the other display systems, the '897 patent does not offer an easily updateable and controllable solution for advertisers interested in presenting their goods and services via public display systems.

Other display systems are presently available commercially. For example, Ceiva Logic, Inc. of Los Angeles, Calif., has produced and marketed a digital picture frame. Ceiva's digital picture frame permits subscribers of their service to display digital pictures of family and friends, as well as, works of art.

Using the Ceiva Gallery, Ceiva customers can also select specific digital images of famous works of art for display. In addition, Ceiva users have the capability to purchase prints from various art collections from the Cieva Internet site. Ceiva's system has several limitations that prohibit its use as a system and method for distributing and maintaining public service messages and advertisements for a fee. For example, Cieva's subscribers must directly select each individual image for display. While the Cieva Gallery permits access to multiple galleries or collections of art works, the user must actively select each image for download and display in accordance with the users's preferred display mode. In contrast, advertisers, politicians, and others that pay a fee for public displays and presentations of their goods, services, and messages desire control of the presentation method, the locations where their information is presented, and assurance that the images were presented.

From the foregoing, it can be appreciated that it would be desirable to have a flexible system and method for conveniently delivering, presenting, and monitoring, publicly displayed digital images that avoids one or more of the problems and/or shortcomings identified above.

SUMMARY OF THE INVENTION

Briefly described, in architecture, a digital image leasing system (DILS) capable of controllably distributing a plurality of digital images selected for presentation via a plurality of respective displays can be realized with one or more servers communicatively coupled via a communications network, and a plurality of identifiable and individually controllable display devices coupled to the one or more servers.

Other embodiments of the DILS may be realized in methods for distributing and presenting preferred data from a host server to a display device through a communications network. A preferred method involves the steps of: (1) identifying a user preference, (2) providing at least one data feed containing information related to the user preference, (3) selecting preferred data from the data feed corresponding to the user preference, (4) pre-loading information that matches the preferred data from the host server to the display device, and (5) presenting the preferred data through the display device.

The DILS and related methods for distributing and presenting preferred data will become apparent to those skilled in the art upon examination of the following drawings and detailed description. All features and advantages of the present invention included herein are protected by the accompanying claims.

BRIEF DESCRIPTION OF THE DRAWINGS

The DILS can be better understood with reference to the following drawings. The components in the drawings are not necessarily to scale, emphasis instead being placed upon clearly illustrating the principles of the invention. Moreover, in the drawings, like reference numerals designate corresponding parts throughout the several views.

DETAILED DESCRIPTION

Based on the current state of the art regarding publicly-observable display systems, there is a need for a flexible and easily managed system for distributing and reliably displaying public service announcements and other images of a commercial and/or political nature, which provides for the remote and distributed coordination and dissemination of the information. A preferred embodiment of the present invention as described below provides a system that is site addressable with the potential for a single facility and/or areas within a facility to present its own unique sequence of images in accordance with its own display schedule. Furthermore, the present invention reduces the need to periodically remove and replace prior art posters, placards, and/or other various signs commonly used to advertise and/or convey various messages in public venues. Moreover, the present invention can take advantage of display technology that presents multiple high quality images over time at refresh rate more in line with today's fast paced society.

DILS—Architecture and Overview

Figure 1:
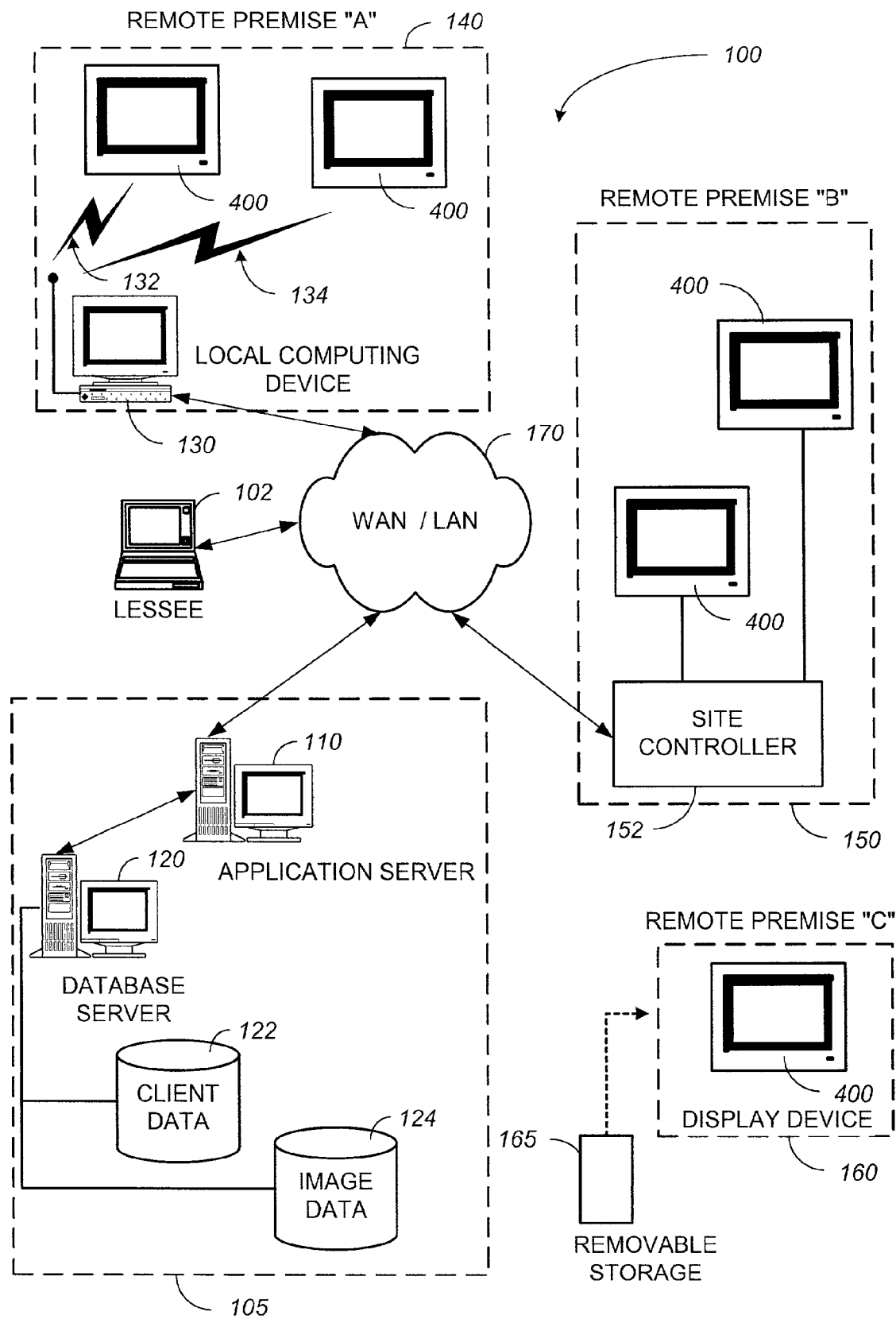
FIG. 1 is a schematic view illustrating various components of an exemplar digital image leasing system in accordance with the present invention.

Referring now in more detail to the drawings, FIG. 1 is a schematic view illustrating various components of an exemplar digital image leasing system in accordance with one embodiment of the present invention. In this regard, the schematic illustrates that in a simple embodiment a digital image leasing system (DILS) 100 may comprise a control site 105 in communication with a service lessee (i.e., a customer) computing device 102 and various remote premises 140, 150, and 160.

A service lessee may communicate with an application server 110 located within the control site 105 by using a suitably configured computing device 102 via a wide area network or local area network (WAN/LAN) 170. In a preferred embodiment, WAN/LAN 170 comprises the public switched telephone network (PSTN) separately or in association with the publicly accessible WAN commonly known as the Internet.

As illustrated, control site 105 may also comprise a database server 120 suitably configured to store client data 122 and image data 124. In more robust embodiments, various routers and gateways configured with appropriate firewalls may be disposed to enable 24 hour controlled access for approved clients to the application server 110. Consequently, any appropriately configured computing device in communication with WAN/LAN 170 can be used to initiate a service/client relationship via appropriately configured software resident and operable on the application server 110. Furthermore, any appropriately configured computing device in communication with WAN/LAN 170 can be used to configure operation of various display devices 400 located at each of the remote premises 140, 150, 160.

In other more distributed embodiments, the application server 110 may be remotely located from the database server 120 with the application and database servers 110, 120 in communication via a proprietary LAN (not shown), a dedicated communication link (not shown), or other suitable communication link. In still other realizable embodiments, underlying application software may be provided by an application service provider (ASP) in communication with WAN/LAN 170 (not shown for simplicity of illustration) and/or the client database 122 and the image database 124 may be stored across one or more distinct servers (not shown).

The flexibility inherent in the DILS 100 is illustrated in the various configurations realizable in each of the remote premises "A," "B," and "C" 140, 150, and 160, respectively. These exemplar configurations represent just some of the many configurations available for conveniently delivering, presenting, and monitoring, publicly displayed digital images consistent with the present invention. For example, remote-premise "A" 140 comprises a local computing device 130 and a plurality of display devices 400. As depicted in the schematic of FIG. 1, the local computing device 130 may be configured with a radio frequency (RF) and/or an infrared (IR) transceiver for establishing a wireless communication link with suitably configured display devices 400.

In a second example, labeled, remote-premise "B" 150, a site controller 152 may be provided to coordinate and control the operation of a plurality of suitably configured display devices 400. As illustrated in FIG. 1, each of the plurality of display devices 400 may be in direct communication with the site controller 152 via various electrically coupled interfaces. For example, each of the display devices 400 may be configured with a modem for establishing periodic communication sessions with WAN/LAN 170 or the PSTN (not shown) via the site controller 152. By way of further example, a plurality of closely located display devices 400 may be daisy-chained on a communications bus (not shown) to permit periodic communications sessions with control site 105 via the site controller 152 and WAN/LAN 170.

In alternative embodiments, the display devices 400 may be configured to interface with WAN/LAN 170 via wireless and wired interfaces other than the local computing device 130 and the site controller 152 illustrated at remote premise "A" 140 and remote premise "B," respectively. Those skilled in the art are familiar with the use of universal asynchronous receiver-transmitters (UARTs) that enable serial communications between computing devices such as the service lessee's computing device 102, application server 110, local computing device 130, and site controller 152 and peripheral devices such as the display devices 400. UARTs are available commercially within standard integrated circuit packages. UARTs have also been implemented within application specific integrated circuits (ASICs) to reduce production costs of peripheral devices. Those skilled in the art are also familiar with integrating UARTs with both RF and IR devices to enable serial communications between remotely located devices, such as the display devices 400 and the local computing device 130.

RF and IR transmitters and receivers associated with the various display devices 400 of the DILS 100 are preferably small in size and may be configured to transmit a relatively low-power signal. As a result, in some applications, the transmission range of a given communication module associated with a particular display device 400 may be relatively limited. This relatively limited transmission range of the communication devices is an advantageous and desirable characteristic of the DILS 100 because it permits reuse of identifiers associated with each of the display devices 400 under the operation and control of the DILS 100.

Although each of the various display devices 400 is depicted without a user interface such as a keypad, in some embodiments the display devices 400 may be configured with user selectable pushbuttons, switches, or the like to permit a technician to configure the display. It should be appreciated that each of the display devices may be configured with a key, password, or other such mechanism to prevent unauthorized adjustments of the display device 400.

In preferred embodiments, once the client relationship is verified, the client or an agent of the client in communication with the application server 110 via local-computing device 130 or lessee computing device 102 may be presented with an interface reflective of a number of display options available from the provider. The display options may provide information regarding the location of available displays, various time slots available to present the client's messages or images, the size and quality of each of the various display devices 400 in the DILS 100, the expected number of visitors at each of the display locations during particular times of day, and other information that the service may provide including rental rates and packages. The client, after having identified one or more display devices, time slots, and/or rental packages may begin to upload one or more digital images to the database server 120 to populate image data 124. It should be appreciated that in alternative embodiments, a client may a priori populate image data 124 with one or more images.

A third example for providing image data to a display device 400 is presented in the schematic illustrated in FIG. 1. In this embodiment, remote premise "C" 160 may comprise a display device 400 configured to receive a removable storage device 165. Removable storage device 165 may take many forms. A number of proprietary data storage devices are presently commercially available. For example, CompactFlash® memory, a solid state memory cartridge sold blank or carrying data-compression software produced by Sandisk Corporation of Santa Clara, Calif. is an exemplar solution for delivering image data to a suitably configured display device 165. The Sony Corporation of Tokyo, Japan also produces and distributes a small portable data storage device Sony deems the Memory Stick®. These and other devices may be used to realize the removable storage device 165 of FIG. 1.

Removable storage device 165 may contain a digital representation of one or more digital images. Those skilled in the art will appreciate that the data representations may be compressed by any of a number of data compression methods. For example, the data representations or files may be compressed using a standard compression technique promulgated by the Joint Photographic Experts Group (JPEG). JPEG is a lossy data compression technique that allows operators to trade image quality for image size.

Display device 400 may be configured to initiate a self-directed initialization or configuration mode upon detecting the placement of the removable storage device 165. For example, upon the detection of the insertion or other association of a removable storage device 165 with the display device 400, the display device 400 may perform a read operation of the memory stored within the removable storage device 165. Firmware, software, and or hardware within the display device 400 may be configured to execute instructions formulated to compare the contents within the removable storage device 165 and to verify capacity and compatibility with the internal storage and operation of the display device 400. In alternative configurations, the display device 400 may be configured to purge presently stored images from its internal memory and attempt to read and store the image data from the removable storage device 165. In this way, an operator or employee of the service may be directed to shuttle an appropriately configured removable storage device 165 containing one or images designated for display at a particular site from the control site 105 to the remote premise "C" 160.

The DILS 100 of the present invention is not limited to the particular embodiments illustrated and described in association with FIG. 1. While the DILS 100 has been illustrated and described with regard to the exemplar remote premise configurations and the site controller configurations illustrated in the schematic of FIG. 1, those skilled in the art will readily recognize a plethora of remote premise configurations and site controller configurations consistent with the teachings of the present invention. For example, a remote premise (not shown) may comprise a combination of several different wireless, wired, and removable data storage interfaces.

Figure 2:
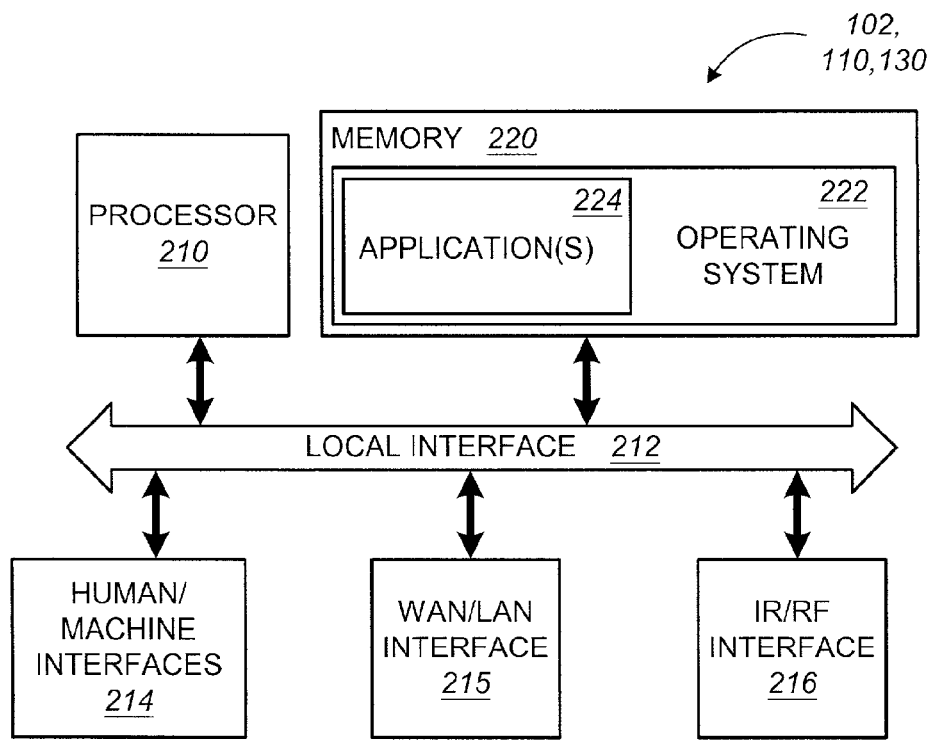
FIG. 2 is a functional block diagram of a local computing device and/or a service lessee's computing device of FIG. 1.

Reference is now directed to FIG. 2, which presents a functional block diagram of a local computing device and/or a service lessee's computing device of FIG. 1. In this regard, the lessee's computing device 102 and the remote-computing device 130 may be very similar devices.

Generally, in terms of hardware architecture, as shown in FIG. 2, the computing devices 102, 130 may include a processor 210, memory 220, and one or more I/O interfaces in the form of human/machine interfaces 214, WAN/LAN interfaces 215, and IR/RF (i.e., wireless) interfaces 216 (or peripheral interfaces) that are communicatively coupled via local interface 212. The local interface 212 can be, for example but not limited to, one or more buses or other wired or wireless connections, as is known in the art. The local interface 212 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 210 is a hardware device for executing software that can be stored in memory 220. The processor 210 can be any custom made or commercially available processor, a central processing unit (CPU) or an auxiliary processor among several processors associated with the computing devices 102, 130, and a semiconductor based microprocessor (in the form of a microchip) or a macroprocessor. Examples of suitable commercially available microprocessors are as follows: a PA-RISC® series microprocessor from Hewlett-Packard Company, an 80x86 or Pentium® series microprocessor from Intel Corporation, a PowerPC® microprocessor from IBM, a Sparc® microprocessor from Sun Microsystems, Inc, or a 68xxx® series microprocessor from Motorola Corporation.

The memory 220 can include any one or combination of volatile memory elements (e.g., random access memory (RAM, such as dynamic RAM or DRAM, static RAM or SRAM, etc.)) and nonvolatile memory elements (e.g. read only memory (ROM), hard drives, tape drives, compact discs (CD-ROM), etc.). Moreover, the memory 220 may incorporate electronic, magnetic, optical, and/or other types of storage media. Note that the memory 220 can have a distributed architecture, where various components are situated remote from one another, but can be accessed by the processor 210.

The software in memory 220 may include one or more separate programs, each of which comprises an ordered listing of executable instructions for implementing logical functions. In the example of FIG. 2, the software in the memory 220 includes various applications 224 that function as a result of and in accordance with a suitable operating system 222. A non-exhaustive list of examples of suitable commercially available operating systems 222 is as follows: a Windows® operating system from Microsoft Corporation, a Netware® operating system available from Novell, Inc., or a UNIX operating system, which is available for purchase from many vendors, such as Hewlett-Packard Company and Sun Microsystems, Inc. The operating system 222 essentially controls the execution of other computer programs, such as applications 224, and provides scheduling, input-output control, file and data management, memory management, and communication control and related services.

The applications 224 are source programs, executable programs (object code), scripts, or other collections each comprising a set of instructions to be performed. When in the form of a source program the program needs to be translated via a compiler, assembler, interpreter, or the like, which may or may not be included within the memory 220, so as to operate properly in connection with the operating system 222. Furthermore, the various applications 224 can be written in an (a) object-oriented programming language, which has classes of data and methods, or in a (b) procedure programming language, which has routines, subroutines, and/or functions. The various applications 224 may be written in a number of programming languages, for example but not limited to, C, C++, Pascal, Basic, Fortran, Cobol, Perl, Java, and Ada.

The human/machine interfaces 214 may include input devices, such as but not limited to, a keyboard, a mouse or other suitable pointing device, a scanner, a microphone, etc. Furthermore, the human/machine interfaces 214 may also include output devices, for example but not limited to, a printer, a monitor, an external speaker, etc.

WAN/LAN interfaces 215 may include a host of devices that may establish one or more communication sessions between the computing devices 102, 130 and WAN/LAN 170 (FIG. 1). WAN/LAN interfaces 215 may include but are not limited to, a modulator/demodulator or modem (for accessing another device, system, or network); a radio frequency (RF) or other transceiver; a telephonic interface; a bridge; a router; etc. For simplicity of illustration these aforementioned two-way communication devices are not illustrated.

If the computing devices 102, 130 take the form of personal computers, workstations, laptop computers, or the like, the software in the memory 220 may further include a basic input output system (BIOS) (also omitted for simplicity of illustration). The BIOS is a set of essential software routines that initialize and test hardware at startup, start the operating system 222, and support the transfer of data among the hardware devices. The BIOS is stored in a ROM so that the BIOS can be executed when the computing devices 102, 130 are activated.

When the computing devices 102, 130 are in operation, the processor 210 is configured to execute software stored within the memory 220, to communicate data to and from the memory 220, and to generally control operations of the computing devices 102, 130 pursuant to the software. The various applications 224 and the operating system 222, in whole or in part, but typically the latter, are read by the processor 210, perhaps buffered within the processor 210, and then executed.

The various applications 224 can be stored on any computer readable medium for use by or in connection with any computer-related system or method. In the context of this document, a computer readable medium is an electronic, magnetic, optical, or other physical device or means that can contain or store a computer program for use by or in connection with a computer related system or method. The various applications 224 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this disclosure, a "computer-readable medium" can be any means that can store, communicate, propagate, or transport a program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CD-ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

As illustrated in FIG. 2, the computing devices 102, 130 may be configured with an IR/RF (i.e., wireless) interface 215 suited to transmit and receive data from a compatibly configured remote device such as the display devices 400 of FIG. 1. Whatever the nature of the IR/RF interface 215, the wireless communication link formed supports the transfer of multiple digital images to compatibly configured display devices 400.

Site Controller—Architecture and Overview

Figure 3:
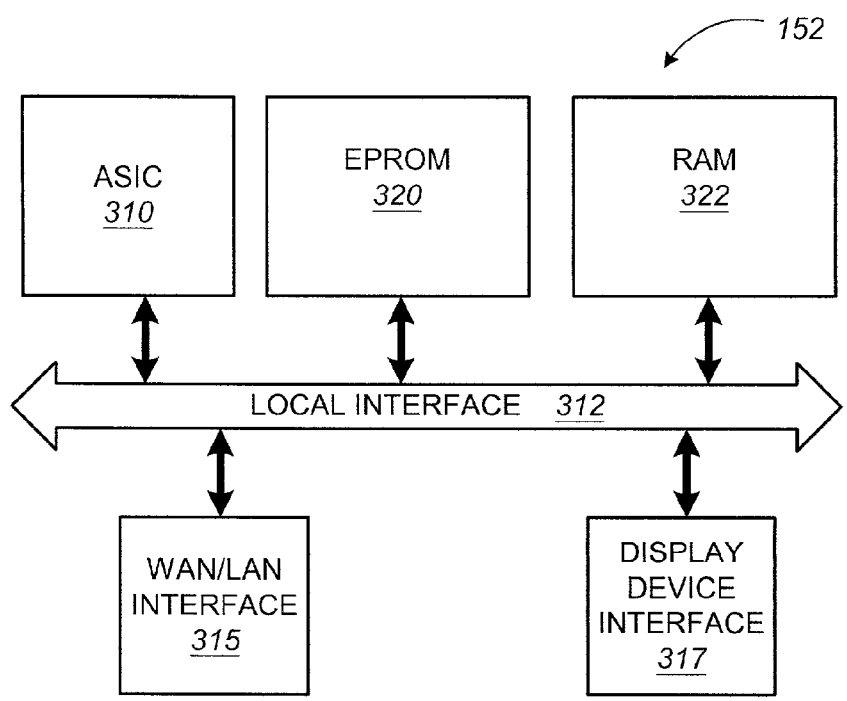
FIG. 3 is a functional block diagram illustrating a site controller of FIG. 1.

Reference is now directed to FIG. 3, which presents a functional block diagram of the site controller 152 of FIG. 1. Those skilled in the art will appreciate that the site controller 152 may be a less-robust device than the computing devices 102, 110, and 130 described above as the site controller 152 will generally only be responsible for coordinating image and instructional data transfers. In this regard, the site controller 152 may comprise an application specific integrated circuit (ASIC) 310, an EPROM 320, RAM 322, WAN/LAN interface 315, and display device interface 317. As illustrated in the schematic of FIG. 3, each of the component parts may be in communication with each other via local interface 312.

The local interface 312 can be, for example but not limited to, one or more buses or other wired or wireless connections, as is known in the art. The local interface 312 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

WAN/LAN interfaces 315 may include a host of devices that may establish one or more communication sessions between the site controller 152 and the various computing devices 102, 110, 130 (and others) in communication with WAN/LAN 170 (FIG. 1). WAN/LAN interfaces 315 may include but are not limited to, a modulator/demodulator or modem; for accessing another device, system, or network); a radio frequency (RF) or other transceiver; a telephonic interface; a bridge; a router; etc. For simplicity of illustration these aforementioned two-way communication devices are not illustrated.

ASIC 310 may be implemented with combinational logic gates, a programmable gate array(s) (PGA), a field programmable gate array (FPGA), etc. The various sub-components (e.g., the logic gates or gate arrays), of ASIC 310 may be arranged to permit the site controller 152 to distribute various control information and image data to each of a plurality of display devices 400 via one or more communication links. EPROM 320 may include identification information associated with a particular site controller 152, as well as identification and configuration information related to each display device 400 designated for operation at a particular premise via the site controller 152. RAM 322 may be provided for the temporary storage of image data, or configuration information designated for each of the display devices 400. RAM 322 may be necessary in order to buffer data received from one or more display devices for situations where the data transfer rate between the site controller 152 and the application server 110 via WAN/LAN 170 differs from the data transfer rate between the site controller 152 and each of the associated display devices 400.

As illustrated in FIG. 3, the site controller 152 may be configured with a display device interface 317. Those skilled in the art will appreciate that the display device interface 317 may take several different forms. For example the interface may take the form of a serial controller electrically coupled to one or more wires further coupled to one or more display devices 400. In alternative embodiments, the display device interfaces 317 may take the form of an IR/RF (i.e., wireless) interface suited to transmit and receive data from a compatibly configured remote device within the display devices 400. Whatever the nature of the display device interface 317, the communication link formed supports the transfer of multiple digital images to compatibly configured display devices 400.

The software in EPROM 320 may include one or more separate programs, each of which comprises an ordered listing of executable instructions for implementing logical functions. In the example of FIG. 3, the software in EPROM 320 may include functionality for receiving images and instructional data from the application server 110. In this regard, the EPROM 320 may include instructions for scheduling, input-output control, file and data management, memory management, and communication control and related services.

Once a communication link has been established between the site controller 152 and the application server 110 via WAN/LAN 170 (FIG. 1), the received images and instructional data may be directed to RAM 322 for temporary buffering until a communication link is established with the designated display device 400. Once a communication link is established between the designated display device 400 and the site controller 152, any instructions and image data updates for the display device 400 may be transferred from the site controller 152 to the display device 400.

Either the display device 400 or the site controller 152 may be configured to initiate a communication session between the two devices. Under some circumstances, the display device 400 may initiate the communication session. For example, the display device 400 may initiate a communication session to report one or more adverse conditions detected during a periodic health status check. Under other circumstances, the site controller 152 may initiate a communication session. These circumstances may include site or premise-wide instructions designated for a plurality of display devices 400 where the site controller 152 may have circuitry resources capable of communicating with a limited number of display devices 400 at any given time.

In some embodiments the site controller 152 may be configured with an interface suited to receive instructions from a technician. In these embodiments, the site controller 152 may include a display panel or other visual means (not illustrated) for prompting and/or providing feedback to the technician. The site controller 152 may also contain a plurality of inputs (not shown) suited to receive command inputs from the technician. It will be appreciated that these embodiments of the site controller 152 may also be associated with appropriate hardware, firmware and/or software to support these interfaces. It should be further appreciated that the site controller 152 may be configured with an operating system, such as but not limited to, Windows CE® for use with computer programs for managing communications and data exchange between handheld and/or remote computing devices and desktop computers. (Windows CE® is a registered trademark of the Microsoft Corporation of Redmond, Wash.)

When the site controller 152 is in operation, the ASIC 310 is configured to execute software/instructions stored within the EPROM 320 and/or RAM 322 to communicate data to and from display devices 400. The various instructions and the operating system where appropriate, in whole or in part, but typically the latter, are read by ASIC 310, perhaps buffered within the ASIC 310, and then executed.

As in the case of the various computing devices described above with regard to the functional block diagram of FIG. 2, the various instructions and/or operating system associated with the site controller 152 of FIG. 3 can be stored on any computer readable medium for use by or in connection with any computer-related system or method. Accordingly, more advanced versions of the site controller 152 may include one or more data storage and transfer devices suitable for interfacing with a computer readable medium as described above.

Display Devices—Architecture and Overview

Figure 4:
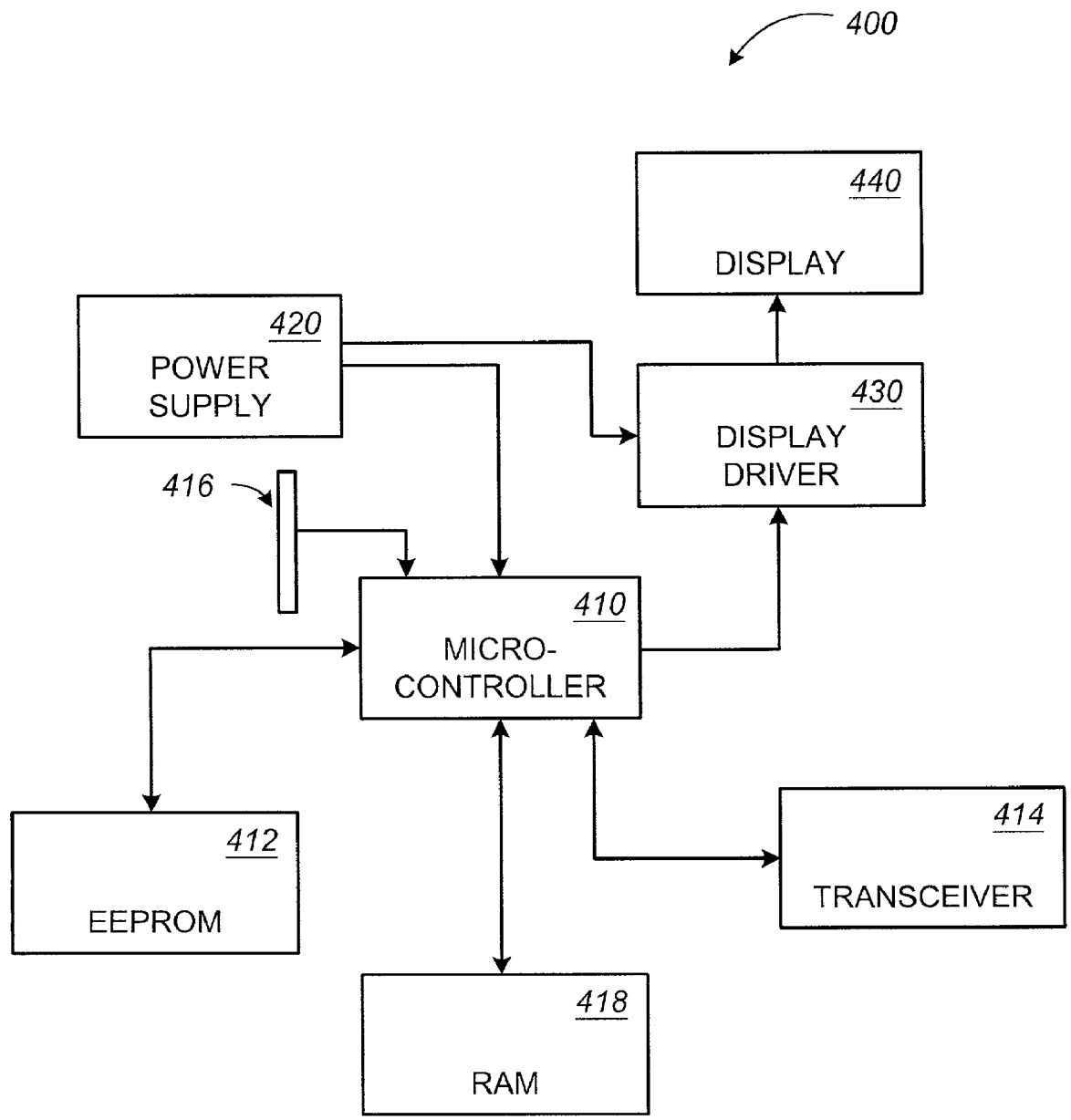
FIG. 4 is a functional block diagram of an exemplar display device that may be used in the DILS of FIG. 1.

Referring now to FIG. 4, the display device 400 may include a micro-controller 410, a power supply 420, a display driver 430, and display 440. As illustrated in the schematic of FIG. 4, the micro-controller 410 may be in communication with an Electrically Erasable Programmable Read-Only Memory (EEPROM) 412, transceiver 414, storage port 416, and RAM 418.

As illustrated in the functional block diagram of FIG. 4, power supply 420 may provide power to both the micro-controller 410 and the display driver 430. In addition to receiving power from power supply 420, the micro-controller 410 may receive data instructions via a removable storage device 165 in cooperation with storage port 416, as well as, EEPROM 412 and/or transceiver 414. In addition to receiving data instructions, the micro-controller 410 may also be configured to receive image data from a removable storage device 165 in cooperation with storage port 416 and/or transceiver 414. Image data received by the micro-controller 410 may then be forwarded to RAM 418 where it may be stored until such time that the microcontroller 410 instructs that the image data should be forwarded via the display driver 430 for presentation via display 440.

EEPROM 412 may include instructions for controlling transceiver 414, storage port 416, and for operating display 440. It will be appreciated that micro-controller 410 may receive and process instructions designed to modify the operation of display device 400. For example, EEPROM 412 may include instructions regarding the number of images to display, how long to display each image in RAM 418, how frequently to establish a communications link with site controller 105, etc. These instructions may be received via a removable storage device 165 in association with storage port 416, transceiver 414, and/or other suitably configured interfaces (not shown). The instructions may then be written to EEPROM 412 in accordance with suitable instructions received from the micro-controller 410.

The embodiment illustrated in the functional block diagram of FIG. 4 is not intended nor should be construed to limit the scope of the present invention to such a display device 400. For example, display device 400 may include other ports for receiving and transmitting information regarding display health. The display device may include other forms of ROM in addition or instead of EEPROM 412.

DILS—Operation

Figure 5:
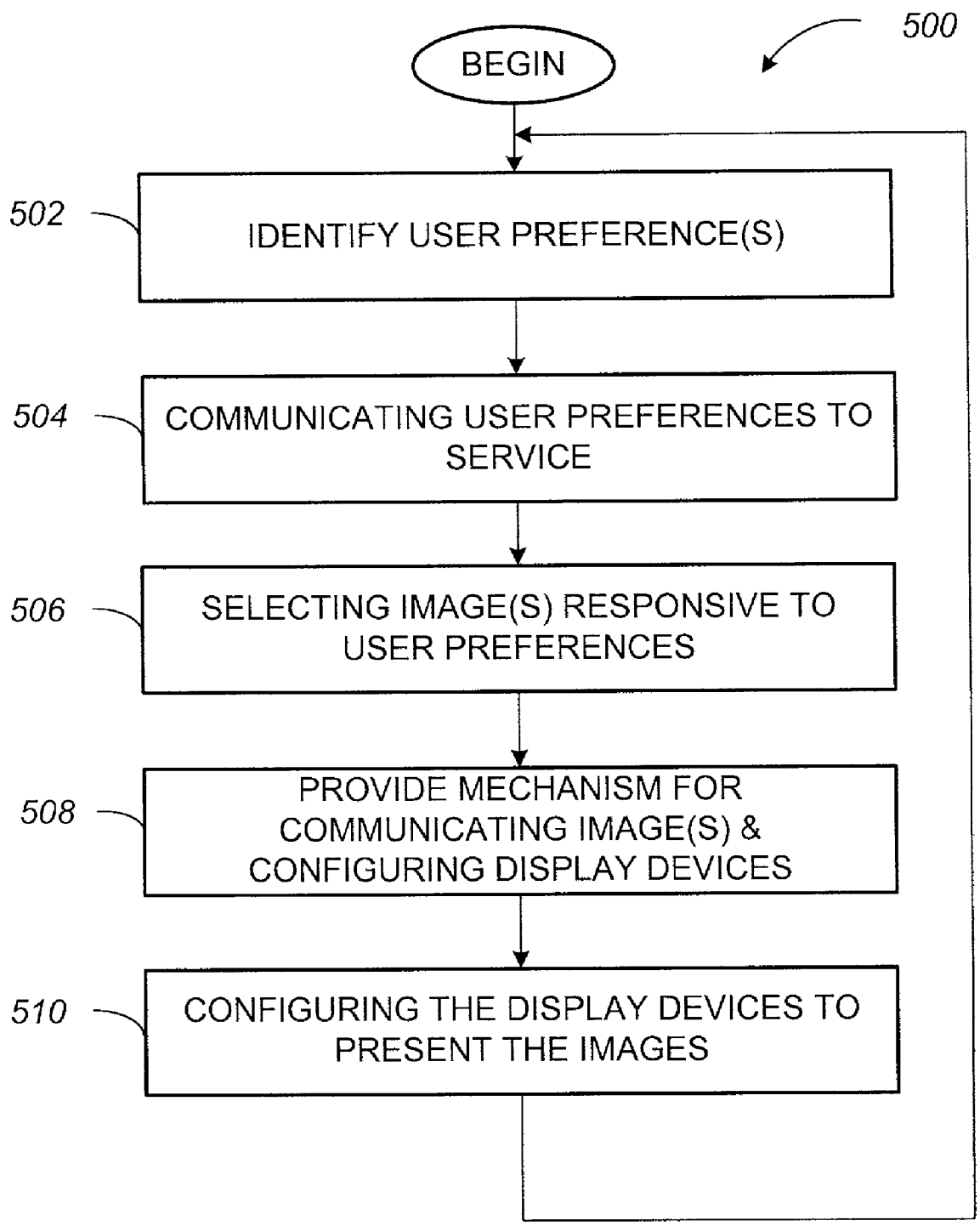
FIG. 5 is a flow chart illustrating a method for distributing and presenting preferred data that may be practiced by the DILS of FIG. 1.

Reference is now made to the flow chart illustrated in FIG. 5, which presents a method for distributing and presenting preferred data (i.e., image data identified by an operator of a lessee computing device 102) from a host server (i.e., application server 110) to a display device 400 through a communications network (e.g., WAN/LAN 170). A preferred method 500 may begin with step 502, where, as illustrated, a client of the DILS 100 of FIG. 1) may identify one or more preferences for publicly displaying one or more messages or images. Next, in step 504, the client communicates the one or more preferences identified in step 502 to an operator of the DILS 100. The client may also transfer a plurality of digital images to an operator of the DILS 100 for the subsequent transfer to a plurality of remote display devices 400.

An operator of the DILS 100 (FIG. 1), as illustrated in step 506, may respond by identifying and/or selecting one or more digital images that meet the preferred criteria communicated by the client. Next, as illustrated in step 508 an application server 110 (FIG. 1) may configure one or more database records in anticipation of initializing a communication link between the control site 105 and one or more local computing devices 130, site controllers 152, and/or display devices 400 directly. Regardless of the device initiating the communication link, once a communication link is established, the method 500 may perform step 510 where a display device 400 is configured to display one or more images designated for the particular display device 400.

Figure 6:
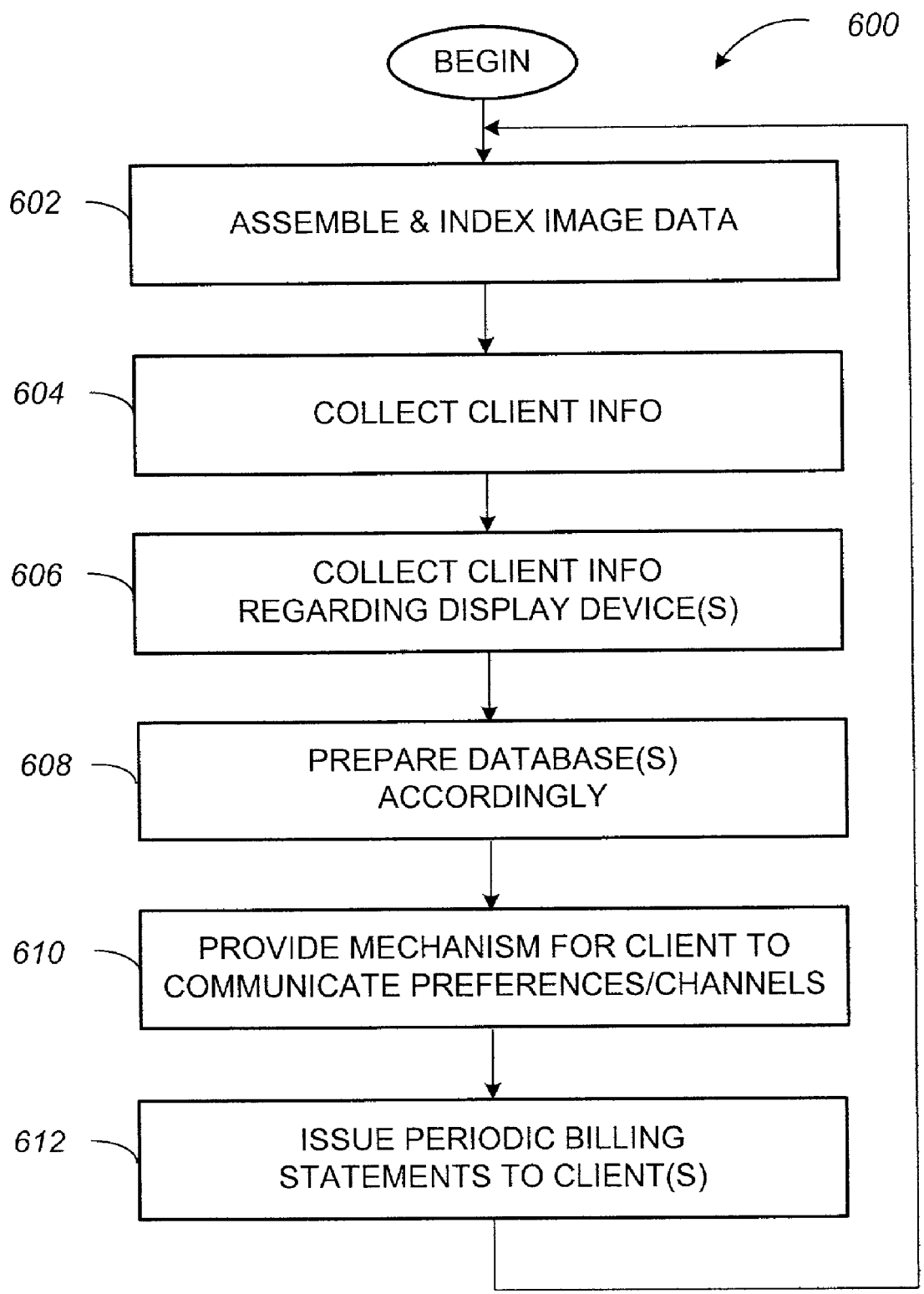
FIG. 6 is a flow chart illustrating a method for operating a service that leases digital images for a fee that may be practiced by the DILS of FIG. 1.

Reference is now directed to the flow chart illustrated in FIG. 6, which presents a method for operating a service that displays digital images for a fee that may be practiced by the DILS of FIG. 1. As illustrated in FIG. 6, a proprietor of the method 600 may begin with step 602 by assembling and indexing a plurality of digital images. It should be appreciated that the proprietor may collect and index images that the proprietor may offer as backgrounds for public service messages, political messages, and/or commercial advertising. Alternatively, and/or concurrently the proprietor of the method 600 may be prepared to receive and store digital representations of similar materials provided by clients of the service.

As shown in step 604, the proprietor may be prepared to collect and store client identification and billing information. The proprietor, having identified clients in step 604, may then be prepared to associate one or more display devices 400 (FIG. 1) with each client of the service as illustrated in step 606. After associating one or more clients of the service with each particular display device 400 in step 606, the proprietor of the method 600 may prepare one or more databases and/or one or more database records in accordance with the various information collected regarding the client, client preferences, select display devices 400, and various information regarding a desired configuration of the display device 400, display frequency, display rates, etc.

Next, as illustrated in step 610, the proprietor may provide a mechanism for communicating the information collected in step 606 to each identified display device 400 that a client has indicated that they would like to present their preferred images. The communication session may result in the transfer of client configuration preferences for the display device 400, the images designated for display, time slots designated for presenting particular images, etc. Finally, the proprietor of the method for operating a service that displays digital images 600 may issue periodic billing statements to the clients. It will be appreciated that a proprietor of such a system may also be prepared to collect, monitor, or otherwise process client payments received in response to the periodic billing statements.

Figure 7:
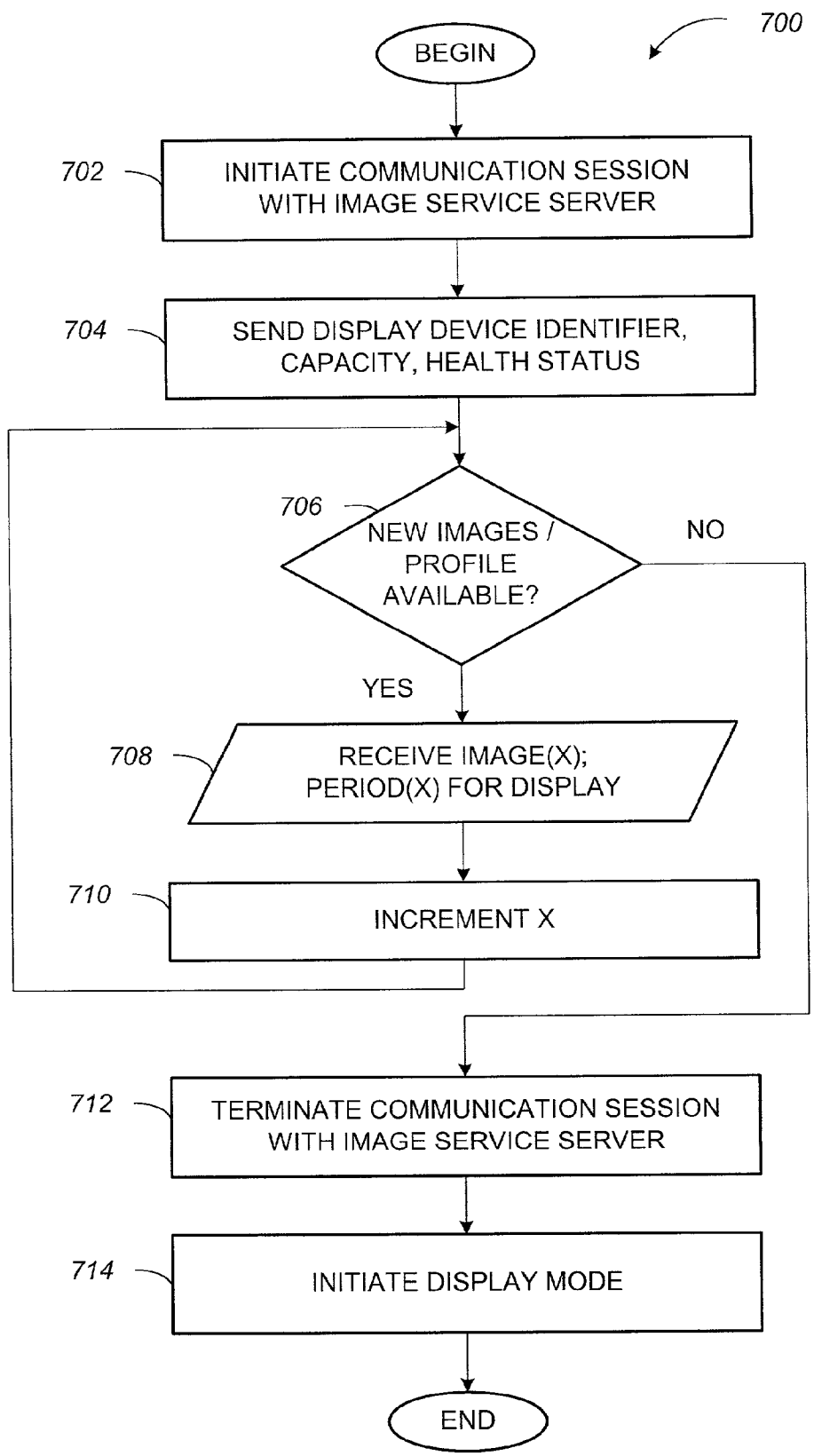
FIG. 7 is a flow chart illustrating a method for updating the display device of FIG. 4.

Reference is now directed to the flow chart of FIG. 7. The flow chart presents a method for updating 700 the display device 400 of FIG. 4. The method 700 may begin with step 702 where a communication session is initiated with an image service server (i. e., applications server 110). Once the communication session has commenced, the display device 400 may be configured to transfer one or more identifiers associated with the particular display device 400. The display device 400 may also be configured to transmit an indication of the relative health of the display device 400. Next, as indicated by the query of step 706 a determination may be made by the applications server 110 as to whether new images and/or configuration information is designated for the particular display device 400. When the response to the query of step 706 is affirmative, i.e., configuration information and/or new images are designated for the display device 400, the display device 400 may be configured to receive the appropriate data as indicated in step 708.

As illustrated in step 710, a counter may be incremented in order to track the number of images transferred to the display device 400. As indicated by the flow control arrow exiting step 710, steps 706 through 710 may be repeated as necessary until the display device 400 has received each of the images designated for storage and periodic presentation by the display device 400. Otherwise, when the response to the query of step 706 is negative, the display device 400 may be configured to terminate the communication session with the application server 110 as illustrated in step 712. Once the communication session is terminated, the display device 400 may be configured to enter a display mode as indicated in step 714.

Figure 8:
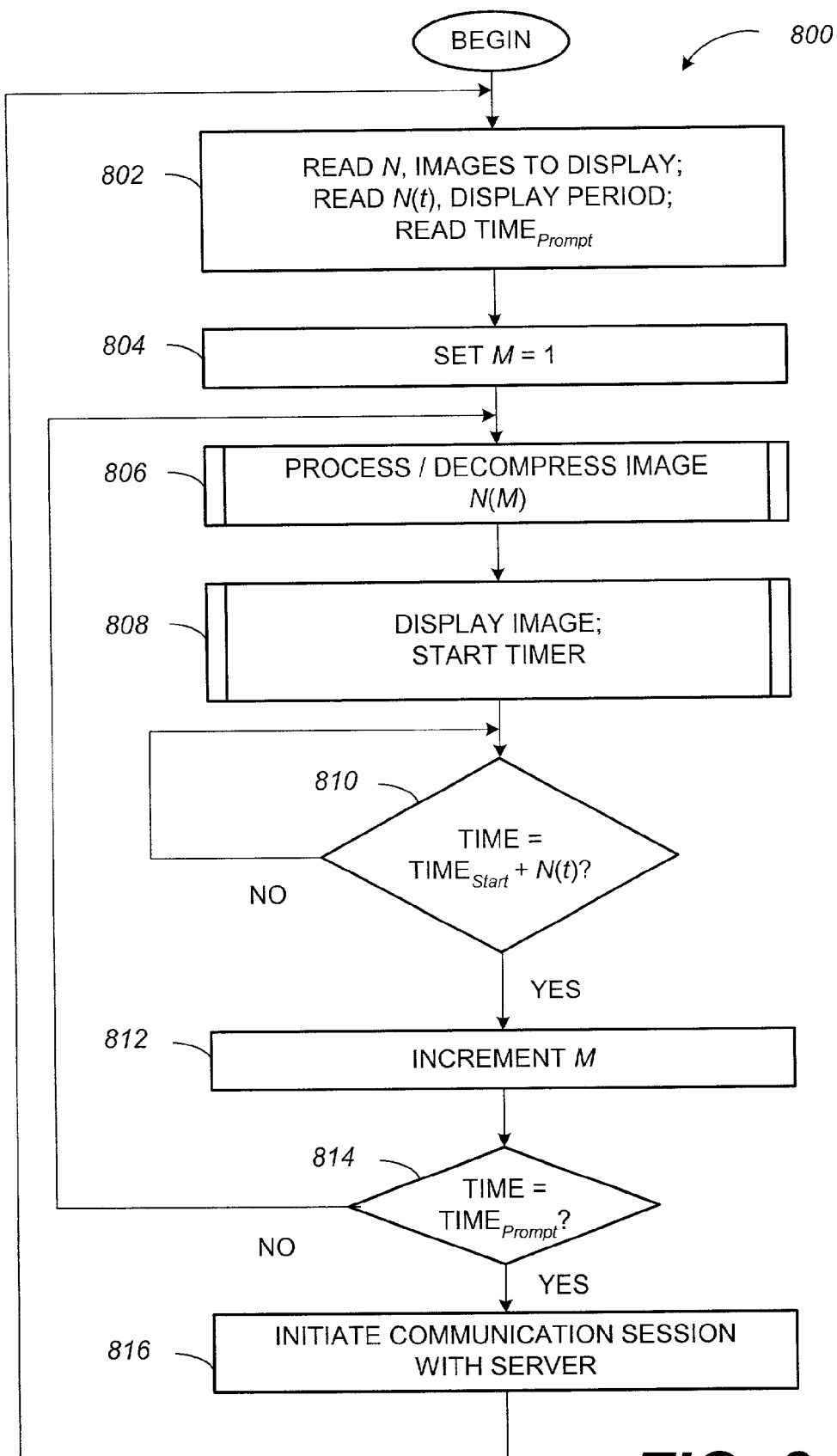
FIG. 8 is a flow chart illustrating a method for operating the display device of FIG. 4.

Reference is now directed to the flow chart of FIG. 8. In this regard, the flow chart presents a method for operating 800 the display device 400 of FIG. 4. The method 800 may begin with step 802 where the display device 400 reads the number of images to display, an indication of how long each of the images received is to be presented on the display device 400. As further illustrated in step 802, the display device 400 may receive an indicator of when the display device 400 should attempt to establish a communication session with the application server 110 (FIG. 1). Next, as indicated in step 804 a counter may be initialized.

The display device 400 may be configured to process a first image from RAM 418 (FIG. 4). After having read a first image from RAM 418 and having decompressed or otherwise translated the image data, the display device 400 may present the image on display 440 (FIG. 4) and start a timer as indicated in step 808. The display device 400 may be configured to perform the query of step 810 in order to determine if the presently displayed image's designated time for presentation has elapsed. When the result of the query of step 810 is negative, the display device 400 may be configured to repeat step 810 until the presently displayed image has been presented on the display for the agreed upon time period.

Otherwise, when the query of step 810 results in an affirmative response, i.e., the designated time for display of the present image has elapsed, the display device 400 may be configured to increment the counter initialized in step 804 as illustrated in step 812. Next, as illustrated in step 814, the display device 400 may be configured to query whether the present time is equal to the next prompt time (i.e., a designated time to attempt to establish a communication link with the application server 110 of FIG. 1). When the response to the query of step 814 is negative, i. e., the display device is to remain in an operation or presentation mode the display device 400 may be configured to repeat steps 806 through 814.

Otherwise, when the response to the query of 814 is affirmative, i.e., it is time for the display device to be updated, the display device 400 may be configured to initiate a communication session with the application server 110 (FIG. 1). As further illustrated in the flow chart of FIG. 8, the display device 400 may repeat steps 802 through 816 as previously described.

Any process descriptions or blocks in the flow charts of FIGS. 6–8 should be understood as representing modules, segments, or portions of code which include one or more executable instructions for implementing specific logical functions or steps in the methods presented. Alternate implementations are included within the scope of the preferred embodiments of the DILS 100 in which functions may be executed out of order from that shown or discussed, including substantially concurrently or in reverse order, depending on the functionality involved, as would be understood by those reasonably skilled in the art of the present invention.

It should be emphasized that the above embodiments of the DILs, particularly any preferred embodiments, are merely possible examples of implementations and are set forth for a clear understanding of the principles involved for distributing and presenting preferred image data via a network for a fee.

What is claimed is:

1. A method for distributing and presenting referred data on a display device located at a predetermined remote premise, comprising:

identifying a user preference;

providing a first communication session between a user and a host server, wherein the first communication session transfers the user preference to the host server;

selecting preferred data responsive to the transferred user preference;

providing a second communication session via a communication link between the host server and a remotely located display device, wherein the second communication session transfers the preferred data and a display control parameter to the display device and transfers an indication of one or more operational conditions of the display device to the host server;

placing the remotely located display device in a presentation mode configured to present the preferred data in response to the display control parameter, the display control parameter including a time period, wherein the presentation mode of the display device displays the preferred data for a duration in accordance with the time period; and at a designated time, initiating a communication session with the host server from the display device in order to receive new preferred data from the host server and to report any adverse conditions to the host server that are detected byte display device during a health status check of the display device.

2. The method of claim 1, wherein the step of identifying a user preference comprises the selection of a digital image.

3. The method of claim 1, wherein the step of identifying a user preference comprises the selection of a presentation duration.

4. The method of claim 1, wherein the step of identifying a user preference comprises information reflective of the location of the remote premise.

5. The method of claim 1, wherein the step of identifying a user preference comprises estimating the number of visitors that may enter observe a periodic display of a plurality of digital images.

6. The method of claim 1, wherein the step of identifying a user preference comprises selecting a presentation sequence when a plurality of digital images are designated for presentation.

7. The method of claim 1, wherein the step of identifying a user preference comprises selecting an input indicative of a period over which the remote display device operates in a presentation mode.

8. The method of claim 1, wherein the step of providing a first communication session further results in the transfer of a display device identifier from the user to the host server.

9. The method of claim 2, wherein the digital image comprises a public service message.

10. The method of claim 2, wherein the digital image comprises a message that describes a service.

11. The method of claim 2, wherein the digital image comprises a message that describes a product.

12. The method of claim 2, further comprising:
generating a periodic statement reflective of the duration of presentation of the digital image.

13. The method of claim 5, wherein the user preference comprises the association of a preferred time slot for the presentation of each of the plurality of digital images.

14. The method of claim 7, the initiating step further comprising:
initiating the communication session from the remote display device to the host server after execution of the presentation mode.

15. The method of claim 12, wherein the periodic statement is reflective of a cumulative presentation time for a digital image at a user agreed digital image presentation rate.

16. A digital image leasing system comprising:
means for collecting a plurality of digital images;
means for indexing the plurality of digital images;
means for recording information reflective of a particular customer;
means for providing a mechanism for the particular customer to communicate image preference;
means far selecting a digital image responsive to the image preference;
means for communicating the digital image to a display device at a remote location, wherein the display device is configured to enter a presentation mode such that the display device is configured to display the digital image in accordance with an amount of time specified by a display parameter; and
means for the display device to transfer information regarding the display device, the display device being configured to initiate a communication session for receiving new digital image data and to report any adverse conditions that are detected by the display device during a health status check of the display device.

17. The system of claim 16, further comprising:
means for the particular customer to transfer a digital image to the collecting means.

18. The system of claim 16, further comprising:
means for the particular customer to request a digital image for presentation at a pre-determined location for a pre-determined time.

19. The system of claim 16, further comprising:
means for billing the particular customer in accordance with the elapsed presentation time of the digital image, wherein a bill is issued over a periodic interval after actual presentation of the digital image.

* * * * *

UNITED STATES PATENT AND TRADEMARK OFFICE
CERTIFICATE OF CORRECTION

PATENT NO. : 7,107,346 B2 Page 1 of 1
APPLICATION NO. : 09/997520
DATED : September 12, 2006
INVENTOR(S) : David W. Boyd It is certified that error appears in the above-identified patent and that said Letters Patent is hereby corrected as shown below:

In column 14, line 43, in Claim 1, delete "referred" and insert -- preferred --, therefor.

In column 15, line 3, in Claim 1, delete "byte" and insert -- by the --, therefor.

In column 16, line 12, in Claim 16, insert -- an -- before "image".

In column 16, line 13, in Claim 16, delete "far" and insert -- for --, therefor.

Signed and Sealed this

Eleventh Day of August, 2009

David J. Kappos
*Director of the United States Patent and Trademark Office*